(12) United States Patent
Smith

(10) Patent No.: US 6,654,201 B2
(45) Date of Patent: Nov. 25, 2003

(54) SHROUD FOR DISK DRIVE WITH PARTICULATE FILTER ELEMENTS

(75) Inventor: Gordon James Smith, Rochester, MN (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 10/008,629

(22) Filed: Dec. 7, 2001

(65) Prior Publication Data

US 2003/0107839 A1 Jun. 12, 2003

(51) Int. Cl.$^7$ .............................................. G11B 33/14
(52) U.S. Cl. ................................................... 360/97.02
(58) Field of Search ........................... 360/97.02, 97.03, 360/97.04

(56) References Cited

U.S. PATENT DOCUMENTS

| | | | | | |
|---|---|---|---|---|---|
| 5,515,214 A | * | 5/1996 | Kiyonaga et al. | ........ | 360/97.02 |
| 5,525,136 A | * | 6/1996 | Rosen | .......................... | 55/486 |
| 5,801,905 A | | 9/1998 | Schirle et al. | ............... | 360/104 |
| 5,804,074 A | * | 9/1998 | Takiguchi et al. | ...... | 210/497.01 |
| 5,804,280 A | * | 9/1998 | Pall et al. | ..................... | 156/155 |
| 6,266,208 B1 | * | 7/2001 | Voights | .................... | 360/97.02 |
| 6,277,176 B1 | * | 8/2001 | Tang et al. | .................... | 55/400 |
| 6,296,691 B1 | * | 10/2001 | Gidumal | .................... | 360/97.02 |
| 6,395,073 B1 | * | 5/2002 | Dauber | ..................... | 360/97.02 |
| 2002/0021527 A1 | * | 2/2002 | Rannow et al. | ........... | 360/97.02 |

OTHER PUBLICATIONS

MICRO: Feb. 1998: Industry News: The Disk Drive Industry and Microcontamination; http://www.micromagazine.com/archive/98/02/breakout.html.
Edwin Dauber, "Optimising Contamination Control in Future Hard Disk Drives"; pp. 41–44.
IBM Technical Disclosure Bulletin; "Duplex Particulate Fiber for Disk Drives", vol. 37, No. 06B, Jun. 1994, pp. 523–524.
IBM Technical Disclosure Bulletin; "New–Class of Filters for Sealed Disk Drives"; vol. 41, No. 01, Jan. 1998, pp. 551–552.
Tzeng, H. M., Research Disclosure "An L–Shaped Particulate Filter for Sealed Disk Drives", Oct. 1992, No. 342.
Tzeng, H. M., Research Disclosure "A Sealed Disk Drive with Optimal Filtration Characteristics", May 1992, No. 337.
Tzeng, H. M., Research Disclosure "Airflow Study in a Cylindrical Enclosure Containing Multiple Corotating Disks". Feb. 23, 1990.

* cited by examiner

*Primary Examiner*—Carl Whitehead, Jr.
*Assistant Examiner*—Jennifer M. Dolan
(74) *Attorney, Agent, or Firm*—James R. Nock; Ronald B. Feece

(57) ABSTRACT

A shrouded hard disk drive includes one or more contamination filter cavities embedded within the shroud for capturing airborne contaminants circulated within the drive during normal operation. The present invention takes advantage of naturally occurring radial and circumferential velocity differences between air at the edges of the disk pack and the air at the filter cavity entrance opening (i.e., the inner circumference of the shroud) to redirect airflow through a filter positioned within the one or more filter cavities. After air passes through the filter, it exits through a filter cavity exit opening positioned in proximity to either in the area between the disks, or the area above or below the disk pack. In order to trap particles entrained in the airflow, the filter can be made of a variety of materials, including: air porous plastic film, expanded polyvinyl chloride plastic, a micro porous polymer of cellulose ester formed around a polyester web, a lint-free weave, an adsorbent, an electret, or an electrically conductive material.

7 Claims, 8 Drawing Sheets

SHROUD FOR DISK DRIVE WITH PARTICULATE FILTER ELEMENTS

FIELD OF THE INVENTION

The present invention relates generally to disk drive systems, and more specifically to an apparatus providing particulate filtration and contamination control in such systems.

BACKGROUND OF THE INVENTION

With the advent of magnetoresistive (MR) head technology and increasingly lower flying heights, microcontamination has emerged as one of the disk drive industry's major concerns. Microcontamination in disk drives can occur in a variety of forms, including particles, humidity, corrosive vapors, and organic gases. Sources of contaminants can be found both in internal components and the external environment where the drives or components are assembled or operated.

Concerns about humidity were initially centered upon its impact on stiction. More recently its facilitation and acceleration of corrosion have garnered the attention of disk drive manufacturers, for a number of reasons. Corrosion susceptibility has increased for the thinner magnetic and protective layers within the advanced MR and giant magnetoresistive (GMR) head designs. Smoother disks that are associated with near-contact recording have also increased sensitivity to humidity and organic contamination. Higher operating temperatures associated with higher RPM drives have increased the concentration levels of contaminants outgassing from the internal components.

Controlling particles is important for preventing head crashes and media corruption. Recent efforts have also focused on preventing thermal asperities. Thermal asperities result when an MR or GMR head is heated due to contact with contamination on the surface of a disk. Reduction in flying heights, as well as the use of certain head designs and media composites has made controlling particles even more crucial. Any inclusion of contaminants such as dust or other particles may cause damage to the disk surfaces if trapped between the disk surfaces and the slider, which is aerodynamically supported at a minute distance above the disk surface. Any solid contaminants trapped between the slider and this disk surface may score, scratch or damage the disk recording surface, destroying the ability of the disk to record or retrieve data reliably at that location (e.g., thermal erasure), and can lead to a head crash. While efforts to eliminate particles within the disk drive are made during assembly, aging and use of the disk drive typically will result in subsequent deterioration of some components and additional contaminant particles being present in the disk drive.

In order to address the contaminant problem in disk drives, particle and adsorption filters have been developed in order to capture and control contaminants. Carbon adsorption filters are commonly employed to reduce hydrocarbons, and other contaminants like acrylic acid and sebacate. Activated carbon and silica gels are used for humidity control.

The two main types of particle filtration devices typically employed within disk drives are breather filters and recirculation filters. To enable the breather filter to be effective in filtering the air coming into the drive, it needs to be the lowest pressure drop path into the drive. In other words, the air must go through the breather filter instead of bypassing it and entering the drive through another unfiltered leak path. Thus, one needs either a drive that has good seals and a very low leakage rate or a low pressure-drop breather filter. Since it typically costs more to seal a drive well, a breather filter with a lower pressure drop is the usual choice. This is particularly important when using adsorbent breather filters, which can have pressure drops that are higher than ambient particle breather filters.

Recirculation filters remove particulates from the air as the spinning disks rotate the air and therefore particles inside the drive. Particle capturing efficiency, resistance to airflow (i.e., air not flowing through the filter remains unfiltered), and filter locations are important in cleaning the air. Resistance to airflow can be affected by the media, but also by the size of the filter or the number of filters used.

Recent high-RPM disk drives use shrouding almost completely around the disk pack in order to reduce power consumption and to reduce disk flutter. Unfortunately, drives with near fully shrouded disk packs typically do not allow for convenient placement of a recirculating type filter (e.g., in a corner of a base casting). Instead, the filters currently employed within shrouded disk packs are complex, bulky devices which are not very effective, since they are not in the optimal recirculation path. As a result, particles generated by the head-disk interface, particularly for disks within the disk pack, are not easily intercepted by the poorly located recirculation filters. In fact, the movement of the air within the disk pack will entrain and circulate the contaminant particles and significantly raise the probability of disk damage. Finally, these filtering approaches consume significant space and increase the complexity of the disk drives, thus preventing or defeating extensive efforts to reduce power consumption of the drive motors.

As a result, there is a need within the disk drive industry for more effective contaminant control in low flying height disk drives, especially in high RPM drives which employ shrouding to reduce power consumption and reduce disk flutter.

SUMMARY OF THE INVENTION

The present invention provides an apparatus for particulate filtration and contamination control in a shrouded disk drive system. The present invention accomplishes this goal by incorporating one or more contamination filter cavities into the disk shroud for capturing airborne contaminants circulated within the drive during normal operation. The present invention takes advantage of naturally occurring radial and circumferential velocity differences between air at the edges of the disk pack and the air at the filter cavity entrance opening (i.e., the inner circumference of the shroud) to redirect airflow through a filter positioned within the one or more filter cavities. After air passes through the filter, it exits through a filter cavity exit opening positioned in proximity to either in the area between the disks, or the area above or below the disk pack.

More specifically, the present invention provides a data storage system having a housing including a set of data disks and at least one read/write head coupled to an actuator assembly. The housing includes a shroud radially positioned around at least a portion of the outer circumference of the set of data disks. The shroud is separated from the outer circumference of the set of data disks by a fixed, predetermined distance, creating a disk-to-shroud separation region. The data storage system further includes at least one filter cavity disposed lengthwise within the shroud. Each filter cavity has at least one entrance opening and an exit opening. The entrance and exit openings are positioned such that circulating air within the disk-to-shroud separation region flows in through the entrance opening and out through the exit opening during normal operation. The data storage system also includes at least one contamination filter positioned within each filter cavity for capturing contaminants carried by the circulating air during normal operation of the disk storage system.

In a preferred embodiment of the present invention, each entrance opening in the filter cavity is positioned in proximity to an outer edge of a disk. The exit opening is positioned in proximity to either the area between two disks, or the area between the top/bottom of the disk pack and the housing. In one embodiment, the filter cavity has a tuning fork appearance, including two entrance openings and one exit opening. In normal operation, the dynamic pressure at each entrance opening of the filter cavity is greater than the dynamic pressure along the major surfaces of the set of data disks. Also, the static pressure at each entrance opening is greater than the static pressure at the exit opening during normal operation.

In a preferred embodiment, one or more of the filter cavities are positioned within an approximately 180 degree arc along the shroud, opposite the actuator assembly. The filter can be located in proximity to the exit opening of the filter cavity, or alternatively, the filter can fill the entire cavity.

In order to trap particles entrained in the airflow, the filter can be made of a variety of materials, including: air porous plastic film, expanded polyvinyl chloride plastic, a micro porous polymer of cellulose ester formed around a polyester web, a lint-free weave, an adsorbent, an electret, or an electrically conductive material.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1:
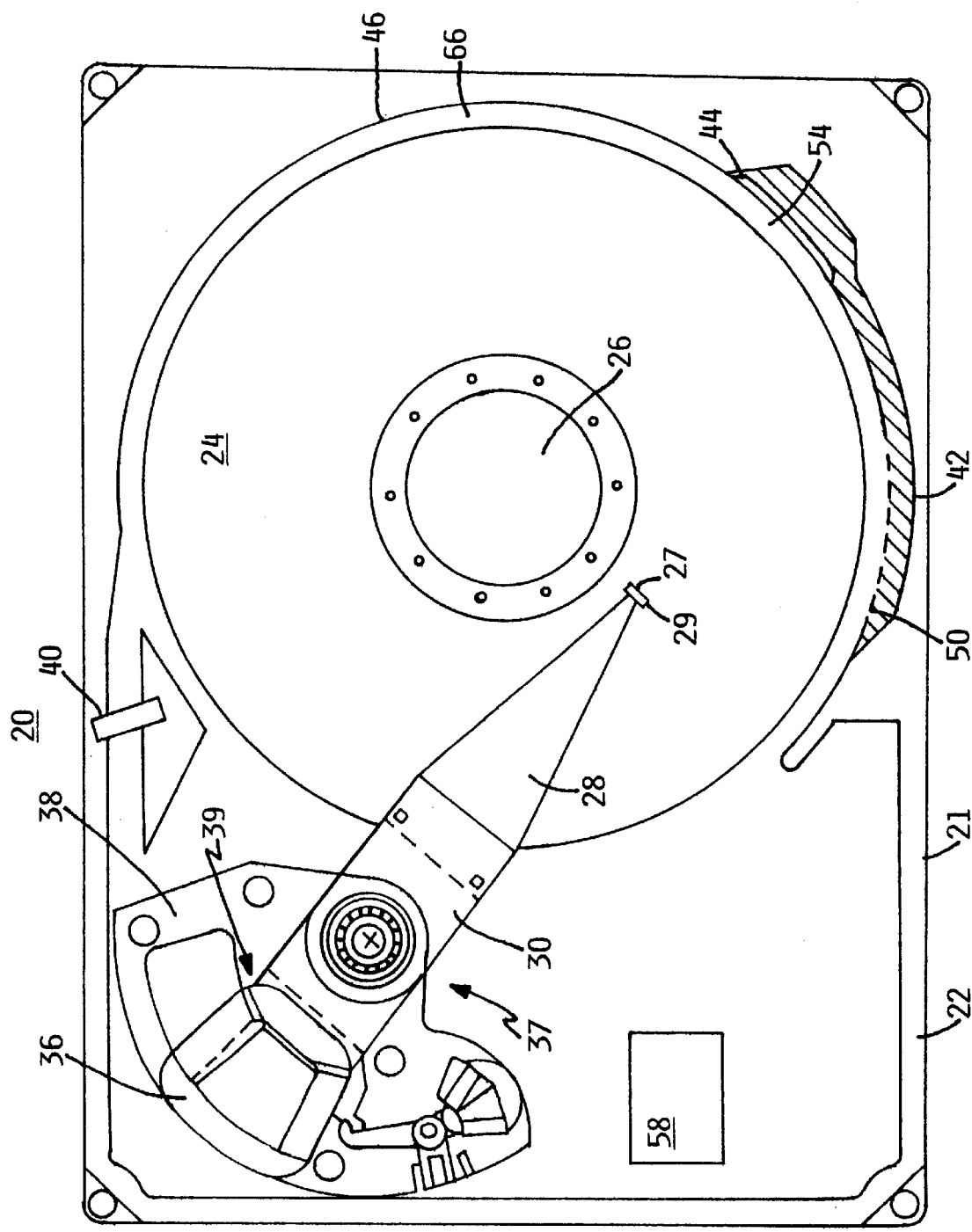
FIG. 1 is a top view of a data storage system in accordance with the present invention with its upper housing cover removed.
Figure 2:
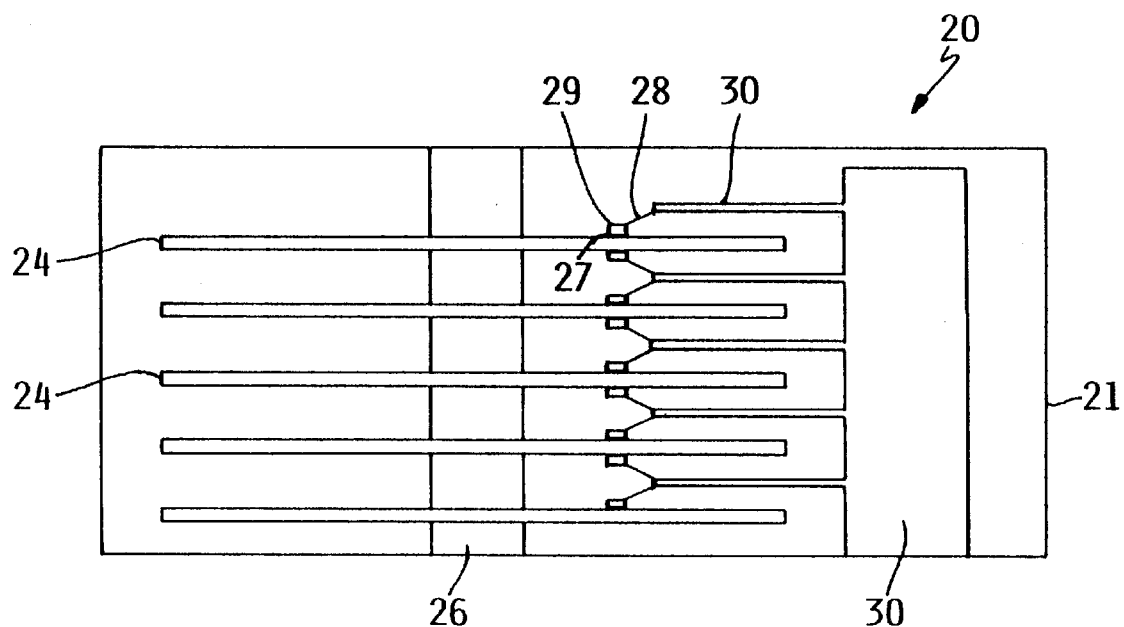
FIG. 2 is a side plan view of a data storage system comprising a plurality of data storage disks.

Turning to the Drawings, wherein like numbers denote like parts throughout the several views, FIG. 1 illustrates a magnetic data storage system 20 with its cover (not shown) removed from the base 22 of the housing 21. As best seen in FIG. 2, the magnetic data storage system 20 typically includes one or more rigid data storage disks 24 which rotate about a spindle motor 26. The rigid data storage disks 24 are typically constructed with a metal, ceramic, glass, or plastic substrate upon which a recording layer is formed. In one typical construction, a magnetizable recording layer is formed on an aluminum or ceramic substrate. In another typical construction, an aluminum optical recording layer is formed on a plastic substrate.

Referring back to FIG. 1, an actuator assembly 37 typically includes a plurality of interleaved actuator arms 30, with each arm having one or more suspensions 28 and transducers 27 mounted on airbearing sliders 29. The transducers 27 typically include components both for reading and writing information to and from the data storage disks 24. Each transducer 27 may be, for example, a magnetoresistive (MR) head having an inductive-type write element and a MR read element. Alternatively, each transducer may be an inductive head having a combined read/write element or separate read and write elements, or an optical head having separate or combined read and write elements. The actuator assembly 37 includes a coil assembly 36 which cooperates with a permanent magnet structure 38 to operate an actuator voice coil motor (VCM) 39 responsive to control signals produced by controller 58. The controller 58 preferably includes control circuitry that coordinates the transfer of data to and from the data storage disks 24, and cooperates with the VCM 39 to move the actuator arms 30 and suspensions 28, to position transducers 27 to prescribed track and sector locations when reading and writing data from and to the disks 24.

Housing 21 further includes a shroud 46 positioned around a portion of the circumference of data storage disks 24. The inner circumference of shroud 46 is separated from the outer circumference of data storage disks 24 by a fixed, predetermined distance, forming a disk-to-shroud separation region 66 between the outer circumference of data storage disks 24 and shroud 46. Shroud 46 mitigates the effects of disk flutter by reducing air friction and turbulence on the disk surfaces of data storage disks 24 by channeling air away from the disk surfaces as they spin. To accelerate the stationary air in the vicinity of the disk edges to approximately that of the velocity of the disk edge itself adds to the energy required to rotate the disk pack. Therefore, the combined load requires larger electrical energy expenditures together with larger disk drive motors and concomitant heating with the disk drive. Disk shroud 46 reduces the mass of air which is circulated and therefore reduces the electrical energy required to spin the disk pack. As data storage disks 24 rotate during normal operation, air from between the disks will be generally directed outwardly from the disks 24 into the disk-to-shroud separation region 66, and also generally circumferentially in the direction that the disk is rotating.

In the present invention, shroud 46 includes one or more contaminant filter chambers (i.e., filter cavities) 42 positioned lengthwise along the circumference of the shroud. Contaminant filter chamber 42 has at least one entrance opening 50 and an exit opening 54 positioned along the disk-to-shroud separation region 66, such that during normal operation, air will be directed to flow into contaminant filter chamber 42 from disk-to-shroud separation region, as data storage disks 24 rotate. Contaminant filter chamber also includes a contamination filter 44 positioned within the chamber such that air entering the chamber through entrance opening 50 will pass through filter 44 before exiting back into the disk-to-shroud separation region 66 at exit opening 54. Further details about the construction and operation of contaminant filter chamber 42 and contamination filter 44 will be provided in subsequent drawings.

Figure 3:
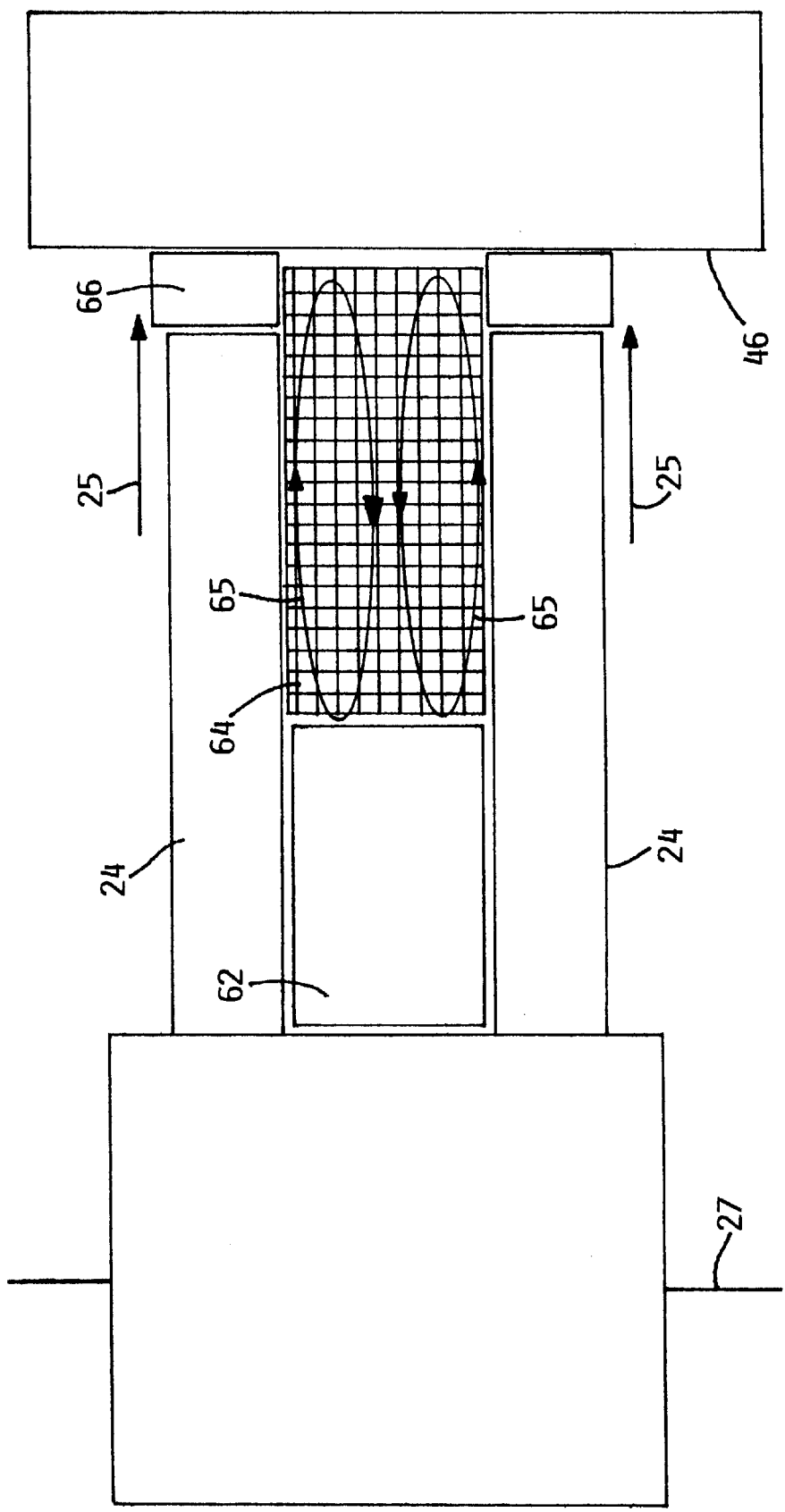
FIG. 3 is a schematic diagram of a rotating disk pack with two disks.

FIG. 3 is a schematic diagram of a rotating disk pack with two disks 24. A rotating disk pack in a high-speed disk drive tends to cause the circulation of a large fraction of the air contained within the disk pack. This air circulation occurs as a result of fluidic friction and shear between the disk surface and the air between the disks. The surfaces of rotating disks 24 transfer energy and rotational movement to the air mass through a boundary layer 25 at the air/disk interface. Boundary layer 25 is defined as the layer of increased velocity in fluids, such as air and water, that is immediately adjacent to the surface of a moving solid past which the fluid is flowing. Thus, boundary layer 25 exists between the surface of the disk and the free air above the disk.

As the air mass is rotated about the axis of the disk 24, the air closest to the axis of rotation 27 will usually have a laminar flow pattern relative to the disk 24 due to the slower speed of the inner disk surface and less shearing action between the disk surface and the air mass. As the radial distance from the axis of rotation 27 of the disk pack increases, the air flow becomes increasingly turbulent. The air is disturbed both by the increased velocity of the disk surface which breaks down the laminar flow boundary layer, and by the actuator arm (not shown) which extends into the space between the adjacent disks of the disk pack.

The airflow within a disk pack can be described in one of three regions for simplicity. The first region 62 is a laminar flow region where the air moves at nearly the disk velocity in a circumferential direction. In this instance, the boundary layers of the two disks have merged and the airflow moves together with the disk surfaces. In the second region 64, there is circulation as air movement toward the outer disk edges (i.e., due to centrifugal force) is replaced and pulled back in between the disks as indicated by directional arrows 65. This second region 64 is a turbulent region. The rotating disk pack acts as a pump as it attempts to discharge the air mass from the periphery of the disks 24. In a third region 66 (also known as the disk-to-shroud separation region), the air moves at close to the same speed as the outer edge of the disk. The third region 66 also has higher dynamic pressure than the second region 64.

The present invention takes advantage of the naturally occurring radial and circumferential velocity differences between the second region 64 and the third region 66 to effectively filter contaminants in a disk drive with a shrouded disk pack. In addition to higher dynamic pressure, the third region 66 has a slightly higher static pressure than the second region 64. In experimentation, a sensitive pressure gauge (Dwyer Model 2005) was used to measure this pressure differential. A static pressure difference of 2 mm of water was measured between the third region 66 and the second region 64. An alternate method of verification was also completed. By connecting a small diameter clear plastic tube (not shown) between small holes drilled through the casting and into the second region 64 and third region 66, it was found that a small amount of fine talc powder initially added to the tubing would move from the third region 66 to the second region 64 when connected to the drive.

Both experiments yielded results which agree with experiments performed earlier by Tzeng et al. in the 1990's at the IBM Almaden Research Center when the flow velocity in a disk pack was visualized using laser Doppler anemometry (i.e., H. M. Tzeng, "An L-Shaped Particulate Filter for Sealed Disk Drives", RESEARCH DISCLOSURE, October 1992, Number 342, H. M. Tzeng, "A Sealed Disk Drive with Optimal Filtration Characteristics", RESEARCH DISCLOSURE, May 1992, Number 337, and J. Chang, M. Grothus and H. M. Tzeng, "New Class of Filters for Sealed Disk Drives", IBM Technical Disclosure Bulletin, Vol. 41, No. 01, January 1998, pages 551–552), herein incorporated by reference. Tzeng found that between the edges of the disks 24 and the shroud 46 (i.e. the third region 66), the mean air velocities were significantly higher than the mean air velocities in the second region 64. Based on Tzeng's measurements, the ratio for the average circumferential air velocity between the second region 64 and the third region 66 is roughly 0.7. In terms of dynamic pressure (which is proportional to the velocity squared), the pressure ratio is approximately 0.5. This relatively large, naturally occurring pressure difference is utilized by the present invention to drive airflow through contaminant filter chamber 42 located in shroud 46.

Figure 4:
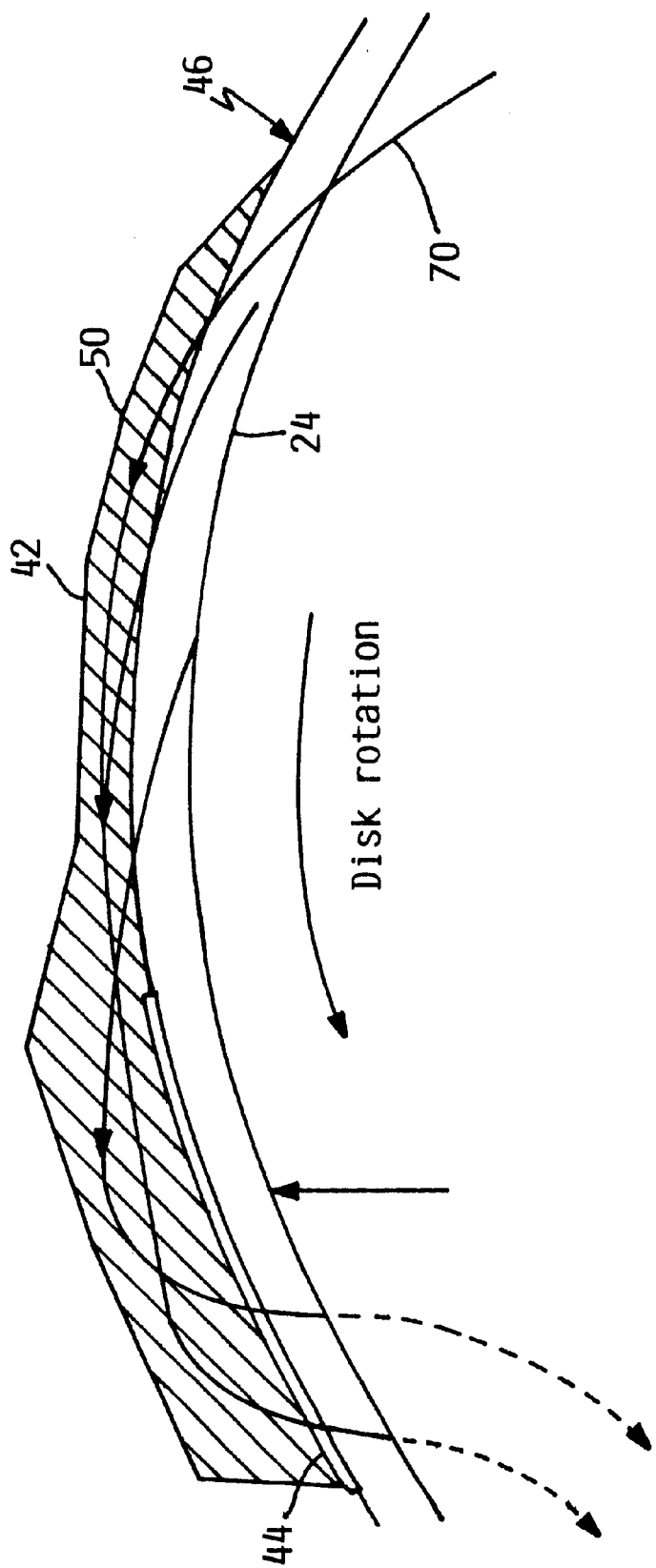
FIG. 4 is a top view of a contaminant filter chamber, in accordance with the present invention.

FIG. 4 illustrates a top view of contaminant filter chamber 42 and contaminant filter 44 integrated into shroud 46, including a representation of the airflow streamlines 70. Small airborne particles less than a few microns in size will strictly follow the streamlines 70 in a flowing gas. The principle of the present invention is to cause a slight redirection of the streamlines 70 into an area where the particles entrained in the airflow can be trapped (i.e., contamination filter 44). Air enters contaminant filter chamber 42 from the edges of the disks 24 (as a result of the dynamic pressure) via entrance opening 50. After the air passes through filter 44, it exits contaminant filter chamber 42 via exit opening 54. Exit opening 54 is positioned such that the air exits in proximity to either the region between the disks, or between the top/bottom of the disk pack and the housing 21 (as a result of the static pressure).

Figure 5:
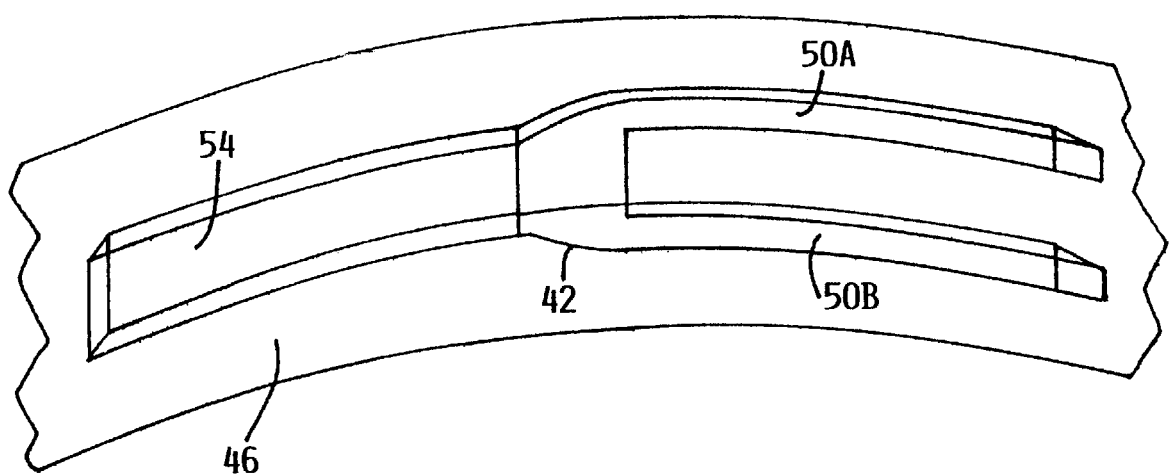
FIG. 5 is an isometric view of the contaminant filter chamber of the present invention.

Turning now to FIG. 5, an isometric side view of the invention is shown. In a preferred embodiment, contaminant filter chamber 42 resembles a tuning fork in appearance, wherein airflow enters contaminant filter chamber at the two narrow fork end openings 50A and 50B (i.e., located near the surfaces of the disks), and exits between the disks 24 at the singular, relatively wider exit opening 54 (i.e., located between the disks).

Figure 6:
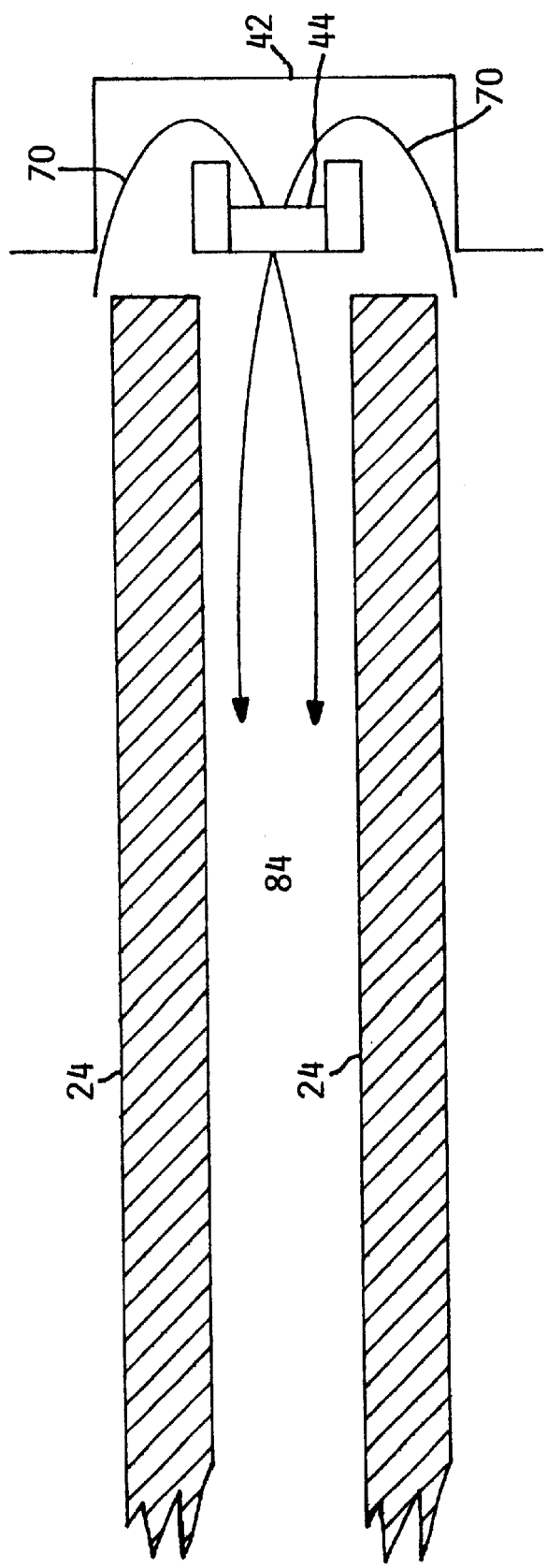
FIG. 6 is a side schematic view of the contaminant filter chamber of the present invention, where two streamlines are shown.

FIG. 6 illustrates a schematic side view of the filter operation. In this figure, two streamlines 70 are shown. Air is ejected from the edges of the spinning disks 24, into contaminant filter chamber 42 and contaminant filter 44. After streamline 70 passes through filter 44, the air is ejected into the region 84 between the disks. Since contaminant filter chamber 42 can be constructed with a very shallow profile, any impact to disk flutter and/or electrical power requirements for the disk drive spindle motor will be minimal.

Contaminant filter 44 can be made from a variety of lightweight materials. In one embodiment, filter 44 is made from an air porous plastic film, having a thickness of approximately 0.01 to 0.1 mm. Such a material allows the capture of particles having a diameter of approximately 0.025 micron or larger. An example of a material is MF-Millipore™ Membrane filters consisting of biologically inert mixtures of cellulose acetate and cellulose nitrate material available from Millipore, Inc.

In another embodiment, filter 44 is made of an expanded polyvinyl chloride (i.e., PVC) plastic. Other materials that are suitable for membrane filters are aluminum oxide and polycarbonate plastic. For these materials, foreign particulate contaminants are trapped at or near the surface of the filter.

In another embodiment, filter 44 is made of a micro porous polymer of cellulose ester formed around a polyester web. These filters retain contamination on the cellulose membrane and are highly retentive non-fiber releasing membrane filters. An example of an appropriate material is RW-Pre filter available from Millipore, Inc.

In another embodiment, filter 44 is made of a porous, weave lint-free material. Three types of weave filters are commonly employed. These types are twill weaves, plain Dutch weaves and twill Dutch weaves. In a twill weave, each weft wire (i.e., the wires running widthwise during weaving) passes successively over two and under two warp wires (i.e., the wires running lengthwise during weaving), and each warp wire passes successively over and under two weft wires. Plain Dutch weaves can accommodate high flow rates with a relatively low pressure drop. They are woven with each warp and weft passing over and under one wire. The weft wires are generally smaller in diameter than the warp wires and are driven up close together, creating a dense weave. Twill Dutch weaves allow an even higher particle retention than plain Dutch weaves. The term "twill" indicates the warp and weft wires pass alternately over two and under two wires. The term "Dutch" refers to the use of a heavier warp wire diameter in conjunction with a lighter weft wire diameter. In a twill Dutch double weave, the weft wires are driven up so tightly that there is always a weft wire above and below the warp wires, creating a weave with the warp wires completely covered. The flow-pass geometry is extremely tortuous, insuring excellent particle size retention.

In another embodiment, filter 44 is made of an adsorbent material. Adsorbent materials serve the purpose of adsorbing unwanted vapors in the disk drive (e.g., chemicals outgassed from subassemblies within the disk drive). Also, adsorbent materials can also act as a desiccant, adsorbing moisture present inside the drive assembly. Examples of adsorbent materials include, but are not limited to: activated carbon, carbon impregnated plastic, calcium chloride and silica gel.

In yet another embodiment, filter 44 is made of an electret material that can store a charge and attract and retain particles. An electret material is an electrically insulating, or dielectric, material that has acquired a long-lasting electrostatic polarization. Electrets are produced by heating certain dielectric materials to a high temperature and then letting them cool while immersed in a strong electric field. An electret is an analog of a permanent magnet.

Finally, in another embodiment, filter 44 is made of an electrically conductive material such as conductive plastic, or a plastic covered with an electrically conductive film. In this embodiment, filter 44 is actively charged and maintained at a predetermined electric potential to attract contaminant particles. This potential can be supplied by a DC power supply attached to or built into the disk drive. This active, electrically coupled filter 44 may be combined with other contaminant control features previously described. As an illustrative example, filter 44 can be constructed of porous, weave lint-free material, where the material includes conductive plastic threads. In this instance, contaminants are not only captured by the tortuous path through the weave, but also by the attractive forces present within the actively powered, electrically charged threads. It is contemplated that a wide variety of additional materials and configurations may be employed for the construction of filter 44, and still remain within the scope and spirit of the present invention.

Figure 7:
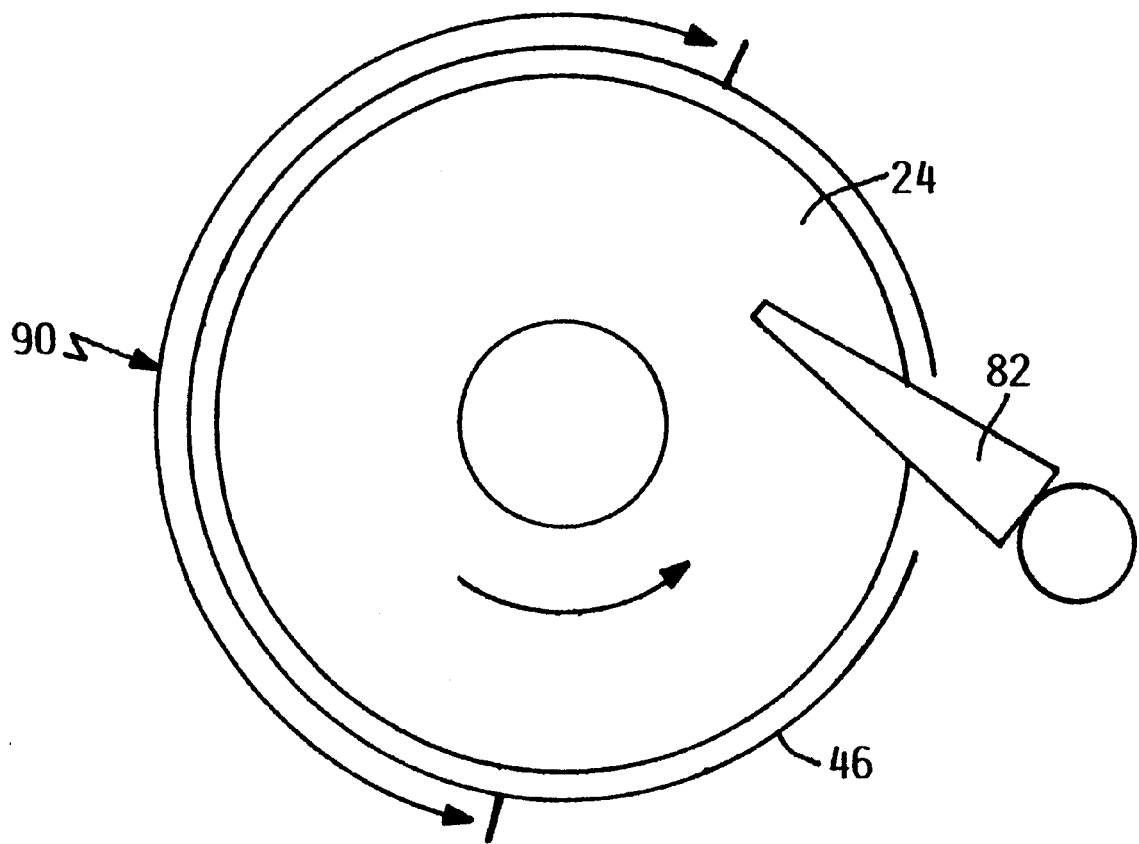
FIG. 7 illustrates an arc of opportunity for adding filter elements into the shroud.

FIG. 7 illustrates an "arc of opportunity" for adding one or more filter elements (i.e., contaminant filter chambers 42 and contaminant filters 44) into shroud 46. To eliminate any influence that a filter element might have on disk drive head dynamics, the filter elements 42,44 typically should not be placed adjacent to the head/arm assembly 82. However, if the influence of the shroud filter on the head dynamics is small, the shroud filter can be placed anywhere along the shroud. A conservative approach is to place one or more filter elements 42,44 along an approximately 180 degree arc 90, as shown in FIG. 7. The filter elements 42,44 described in this invention can be placed in several locations in shroud 46 around the periphery of the disk pack.

Contaminant filter 44 can be placed about the exit cavity 54 as shown previously in FIG. 4, or alternatively, it can completely fill the contaminant filter chamber 42 (e.g., a foam that naturally includes labyrinths with open cells to trap particles). Particles can also be trapped by impaction and deposition on small obstacles placed between the entrance 50 and exit 54 regions of contaminant filter chamber. The obstacles may then be coated with a sticky, non-outgassing adhesive material, (e.g., an inert oil). As contaminant particles come into contact with the adhesive material, they are captured and retained. It is contemplated that an adhesive material can be applied to additional surfaces within the contaminant filter chamber 42. In addition, the interior surface of the channels within the contaminant filter chamber 42 may be roughened which will also aid in trapping particles. Finally, the inside of channels can be made sticky to further enhance particle collection.

Figure 8:
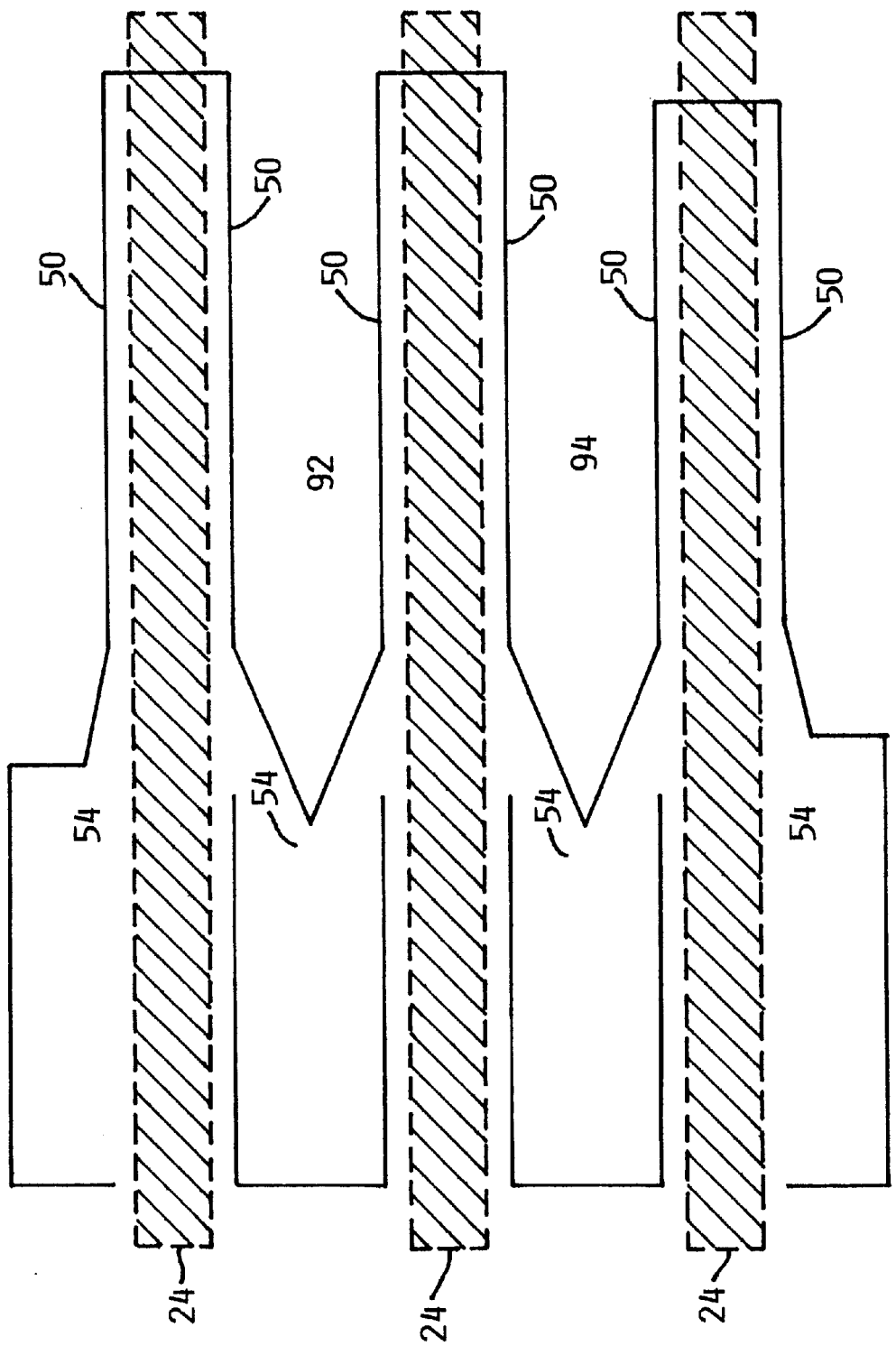
FIG. 8 illustrates an embodiment of the present invention, wherein three disks are present.

FIG. 8 illustrates an embodiment of the present invention, wherein three disks 24 are present. In the illustrated embodiment, the area between disks (i.e., the area between disk "1" and disk "2" 92, and between disk "2" and disk "3" 94) includes two entrance openings (i.e., inlets) 50 located near the disk surfaces and a single exit opening (i.e., outlet) 54 centered between the disks. The top surface of the topmost disk and the bottom surface of the bottommost disk has a single inlet 50 and a single outlet 54. The illustrated embodiment can easily be extended to disk packs containing more than three disks.

Additional modifications may be made to the illustrated embodiments without departing from the spirit or scope of the invention. Therefore, the invention lies in the claims hereinafter appended.

What is claimed is:

1. A data storage system, comprising:
    a housing having an interior containing a set of data disks and at least one reading and/or writing head coupled to an actuator assembly;
    a shroud mounted within the interior of the housing, the shroud radially positioned around at least a portion of the outer circumference of the set of data disks, the shroud separated from the outer circumference of the set of data disks by a fixed, predetermined distance along the length of the shroud, creating a disk-to-shroud separation region;
    at least one filter cavity disposed lengthwise within the shroud, the at least one filter cavity having at least one entrance opening and an exit opening, the at least one entrance opening and the exit opening positioned such that circulating air within the disk-to-shroud separation region flows in through the at least one entrance opening and out through the exit opening during normal operation of the data storage system, wherein the exit opening in the at least one filter cavity is positioned in proximity to an area formed between the top/bottom of the set of data disks and the housing; and
    at least one contamination filter positioned within the at least one filter cavity for capturing contaminants carried by the circulating air during normal operation of the data storage system.

2. A data storage system, comprising:

a housing having an interior containing a set of data disks and at least one reading and/or writing head coupled to an actuator assembly;

a shroud mounted within the interior of the housing, the shroud radially positioned around at least a portion of the outer circumference of the set of data disks, the shroud separated from the outer circumference of the set of data disks by a fixed, predetermined distance along the length of the shroud, creating a disk-to-shroud separation region;

at least one filter cavity disposed lengthwise within the shroud, the at least one filter cavity having at least one entrance opening and an exit opening, the at least one entrance opening and the exit opening positioned such that circulating air within the disk-to-shroud separation region flows in through the at least one entrance opening and out through the exit opening during normal operation of the data storage system, wherein the at least one filter cavity has a tuning fork appearance, including two entrance openings and one exit opening; and at least one contamination filter positioned within the at least one filter cavity for capturing contaminants carried by the circulating air during normal operation of the data storage system.

3. The data storage system of claim 2, wherein a first entrance opening of the two entrance openings is positioned in proximity to a bottom surface of a first disk of the set of data disks, and a second entrance opening of the two entrance openings is positioned in proximity to a top surface of a second disk of the set of data disks.

4. The data storage system of claim 3, wherein the exit opening is positioned in proximity to an area formed between the bottom surface of the first disk and the bottom surface of the second disk in the set of data disks.

5. A data storage system, comprising:

a housing having an interior containing a set of data disks and at least one reading and/or writing head coupled to an actuator assembly;

a shroud mounted within the interior of the housing, the shroud radially positioned around at least a portion of the outer circumference of the set of data disks, the shroud separated from the outer circumference of the set of data disks by a fixed, predetermined distance along the length of the shroud, creating a disk-to-shroud separation region;

at least one filter cavity disposed lengthwise within the shroud, the at least one filter cavity having at least one entrance opening and an exit opening, the at least one entrance opening and the exit opening positioned such that circulating air within the disk-to-shroud separation region flows in through the at least one entrance opening and out through the exit opening during normal operation of the data storage system, wherein the difference in static pressure between the at least one entrance opening and the exit opening is approximately 2 mm of water; and at least one contamination filter positioned within the at least one filter cavity for capturing contaminants carried by the circulating air during normal operation of the data storage system.

6. A data storage system, comprising:

a housing having an interior containing a set of data disks and at least one reading and/or writing head coupled to an actuator assembly;

a shroud mounted within the interior of the housing, the shroud radially positioned around at least a portion of the outer circumference of the set of data disks, the shroud separated from the outer circumference of the set of data disks by a fixed, predetermined distance along the length of the shroud, creating a disk-to-shroud separation region;

at least one filter cavity disposed lengthwise within the shroud, the at least one filter cavity having at least one entrance opening and an exit opening, the at least one entrance opening and the exit opening positioned such that circulating air within the disk-to-shroud separation region flows in through the at least one entrance opening and out through the exit opening during normal operation of the data storage system, wherein the at least one filter cavity is positioned within an approximately 180 degree arc opposite the actuator assembly; and at least one contamination filter positioned within the at least one filter cavity for capturing contaminants carried by the circulating air during normal operation of the data storage system.

7. A data storage system, comprising:

a housing having an interior containing a set of data disks and at least one reading and/or writing head coupled to an actuator assembly;

a shroud mounted within the interior of the housing, the shroud radially positioned around at least a portion of the outer circumference of the set of data disks, the shroud separated from the outer circumference of the set of data disks by a fixed, predetermined distance along the length of the shroud, creating a disk-to-shroud separation region;

at least one filter cavity disposed lengthwise within the shroud, the at least one filter cavity having at least one entrance opening and an exit opening, the at least one entrance opening and the exit opening positioned such that circulating air within the disk-to-shroud separation region flows in through the at least one entrance opening and out through the exit opening during normal operation of the data storage system, wherein interior surfaces of the at least one filter cavity are roughened in order to enhance particle retention capability; and at least one contamination filter positioned within the at least one filter cavity for capturing contaminants carried by the circulating air during normal operation of the data storage system.

* * * * *